United States Patent [19]

Lill et al.

[11] 3,952,152

[45] Apr. 20, 1976

[54] CRT SHIELD

[75] Inventors: William B. Lill, Glenview; Edward M. Rezotko, Rolling Meadow, both of Ill.

[73] Assignee: Teletype Corporation, Skokie, Ill.

[22] Filed: Oct. 29, 1974

[21] Appl. No.: 518,698

[52] U.S. Cl. .............................. 178/7.82; 29/25.13

[51] Int. Cl.[2] ...................... H01J 9/00; H01J 29/86; H04N 5/65

[58] Field of Search ................................ 178/7.82

[56] References Cited

UNITED STATES PATENTS

| | | | |
|---|---|---|---|
| 2,673,342 | 3/1954 | Sims | 178/7.82 |
| 2,977,412 | 3/1961 | Rhodes | 178/7.82 |
| 3,610,994 | 10/1971 | Sheldon | 178/7.82 |
| 3,623,196 | 11/1971 | Bongenaar | 178/7.82 |

*Primary Examiner*—Howard W. Britton

*Attorney, Agent, or Firm*—W. G. Dosse; D. L. Hurewitz; J. L. Landis

[57] ABSTRACT

A CRT shield comprising a woven metallic mesh screen seam welded to a metal collar which is perforated around its periphery. The collar is fitted over the face of the CRT with an implosion screen and a plastic mounting housing positioned in turn over the face of the screen and then potted with an epoxy resin through the perforations in the collar to form one rigid, bonded structure. A tapered metal shielding is then fitted in overlapping relationship with the collar, and a metal end cap fitted over the neck of the CRT and overlaps the tapered shield in order to completely surround the CRT with metal shield material.

10 Claims, 2 Drawing Figures

CRT SHIELD

FIELD OF THE INVENTION

The present invention relates to a CRT shield and particularly a shield for completely enclosing a cathode ray tube in metal while maintaining visibility thereof.

BACKGROUND OF THE INVENTION

A cathode ray tube is capable of producing considerable emanations outside the visible spectrum which emanations might be received and decoded at a distance in order to reproduce the information displayed on the screen of the cathode ray tube. One prior art technique for minimizing such emanations is disclosed in U.S. Pat. No. 2,673,342 granted on Mar. 23, 1954 to J. C. Sims, Jr. et al. and comprises a tapered body for shielding the major portion of the cathode ray tube. A metallic mesh screen is soldered to a plate which is then mounted within the large end of the tapered shield in order to permit viewing of the screen and yet minimize the emanation of signals within the nonvisual electromagnetic spectrum. It is also well known to coat the implosion screen of the CRT with a conductive material that is also transparent in order to suppress X-radiation. However, modern signal sensing and receiving apparatus is so sensitive that even these prior art techniques cannot prevent unauthorized receipt of information concerning the data displayed on the face of the CRT.

It is an object of the present invention to more fully enclose a cathode ray tube in order to minimize nonvisual emanations therefrom.

SUMMARY OF THE INVENTION

The present invention relates to minimizing nonvisual electromagnetic emanation from a CRT using a conductive collar bonded to a conductive screen and the collar projecting along the periphery of the face of the CRT towards the neck thereof with a conductive, tapered shield matching generally the shape of the tube and yoke and having a lip overlapping collar with an electrical interconnection between the tapered member and the collar.

BRIEF DESCRIPTION OF THE DRAWING

A more complete understanding of the present invention may be had by referring to the following detailed description when considered in conjunction with the accompanying drawing wherein like reference numbers denote the same or similar parts throughout the several views in which.

DETAILED DESCRIPTION

Figure 1:
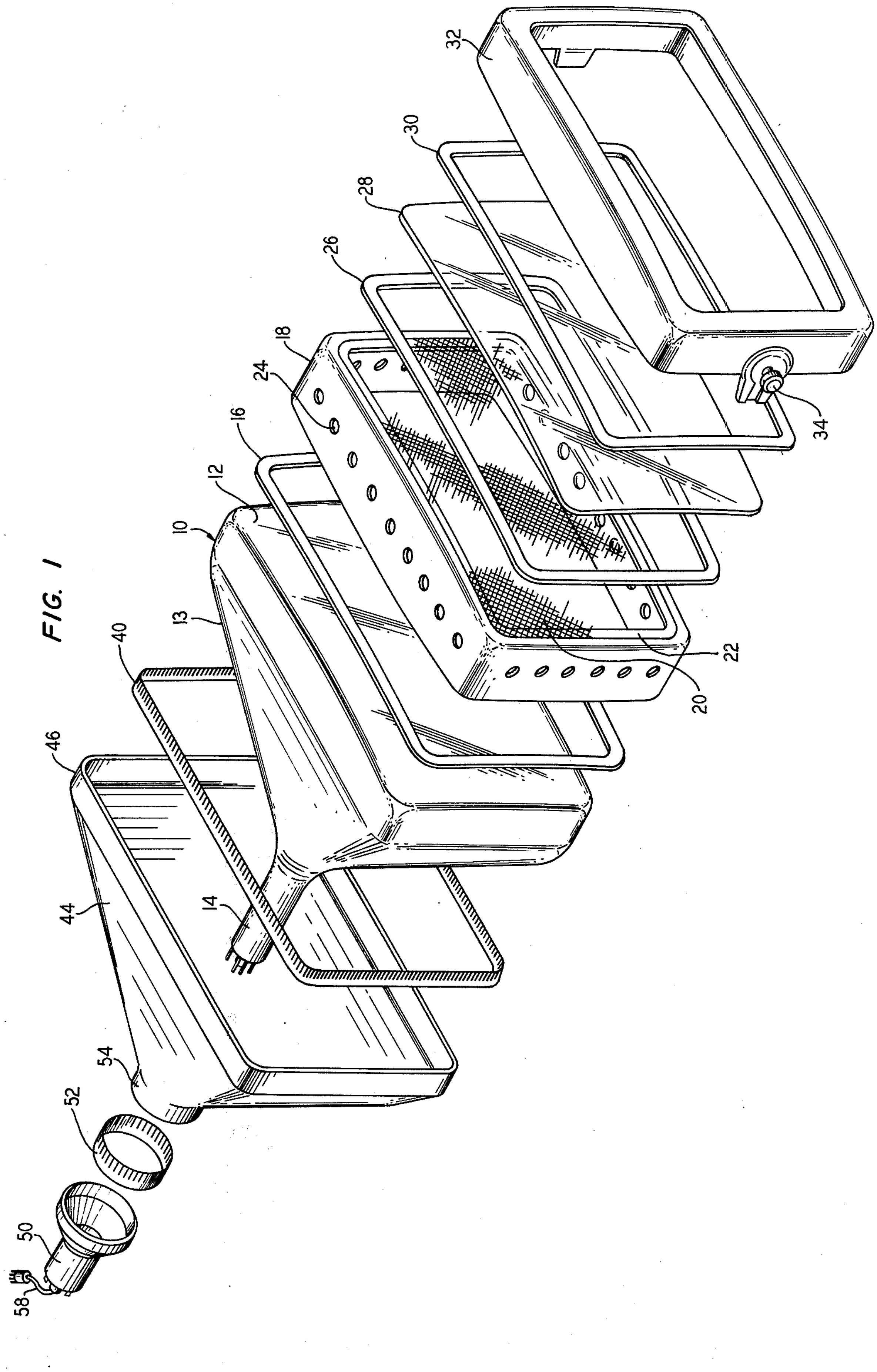
FIG. 1 is an exploded view in perspective of a CRT with the components of the shielding.

Referring now to the drawings and more particularly to FIG. 1, there is shown within the shielding system, the CRT 10 to be shielded. The CRT comprises a face 12, a tapered part 13 and a neck 14 and is of thoroughly conventional construction. A conventional yoke structure (not shown) is also included on the neck of the CRT.

A very thin gasket 16 of adhesive-backed polyurethane foam material is put around the face 12 of the CRT 10. A brass collar 18 is placed over the periphery of the face 12 of the CRT 10 and engages the gasket 16 which separates the metal of the collar 18 from the glass of the CRT.

A phosphor bronze wire mesh screen 20 of very fine gage is seam welded (a series of spot welds) all around the periphery 22 of an opening in the collar 18 such that the screen 20 covers the entire viewing area of the face 12 of the CRT. The purpose of the mesh screen is to permit viewing of the images on the face 12 of the CRT while preventing the passage of nonvisual electromagnetic radiation that may emanate from the face 12.

The collar 18 has a plurality of perforations 24 around its rim which perforations are small enough in size and number to avoid the passage of significant amounts of radiation therethrough. However, these perforations are large enough and frequent enough around the periphery of the collar 18 to facilitate later bonding of the shield as will be explained in more detail below.

Another polyurethane foam gasket 26 separates the collar 18 from a conventional, tempered glass safety, implosion panel 28. If the screen 20 is strong enough and fine enough to retain glass particles in the event of an implosion of the CRT, the panel 28 would, of course, not be necessary. However, in order to facilitate the transmission of substantial quantities of light and energy, the screen 20 is preferably made of very small wire which may not provide sufficient structural strength to stop glass particles in the event of an implosion.

It will be well recognized that the implosion panel 28 can readily be placed between the face 12 and the screen 20 without impairing the operation of the implosion panel in protecting the viewer nor the operation of the screen 20 in trapping nonvisual emanations.

Still another thin polyurethane foam gasket 30 separates the implosion panel 28 from a mounting frame 32. The mounting frame 32 is equipped with mounting fixtures 34 and is formed preferably of molded thermoplastic such, for example, as polyphenylene oxide, with the mounting fixtures 34 formed integrally therewith.

Figure 2:
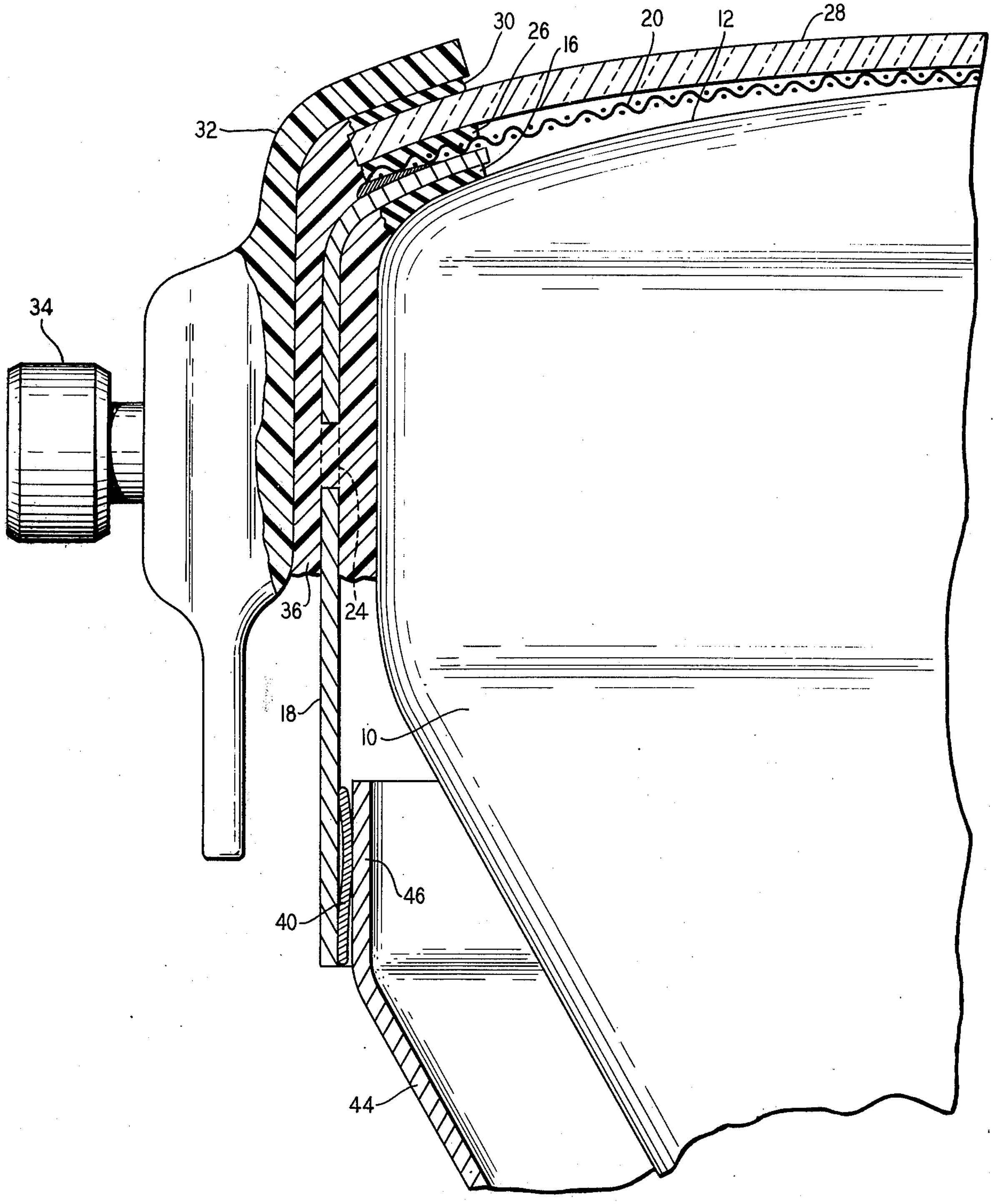
FIG. 2 is a detail of the shielding mounting hardware and potting thereof to the CRT.

All of the structural components from the cathode ray tube 10 through to the mounting frame 32 are sandwiched together to form a compact structure which is shown schematically and fragmentarily in cross section in FIG. 2. An epoxy adhesive 36 is then introduced into the region between the periphery of the tube 10 and the mounting frame 32 with the collar 18 positioned therebetween. The epoxy, as is well known in the art, forms a strong bond to the surface of the CRT 10 and also to the inner surface of the mounting frame 32 as well as to both sides of the collar 18. As can be readily seen in FIG. 2 the perforations 24 provide a direct link between the epoxy in contact with the CRT 10 with the epoxy in contact with the inner surface of the mounting frame 32 without depending significantly upon the bonding of the epoxy to the collar 18.

A length of beryllium-copper spring-metal finger stock 40 is seam welded to the inside of the collar nearest its periphery amd remote from the face 12 of the CRT. A tapered or dished portion 44 is made preferable of a magnetically-permeable material known generally as Mu-METAL and is composed of a major portion of nickel and minor portions of iron and copper. It may be desirable to copper-plate the Mu-METAL to increase its conductivity. The tapered end of the portion 44 extends over the tapered part 13 of the CRT and is of a size such that its periphery 46 frictionally engages the finger stock 40 that is bonded to the inside of the collar 18. Engagement with the finger stock 40 frictionally holds the tapered portion 44 in engagement with the collar 18. Such engagement also assures that a minimum of space exists between the collar 18 and the portion 44 so as to minimize the emanations passing through any gap between these two pieces of metal. Electrical continuity is also assured with a frictional engagement between the collar 18 and the portion 44, which friction is controlled by the nature of the finger stock 40.

A neck portion 54 of the tapered portion 44 can extend over the yoke and gun of the CRT in order to magnetically shield these magnetically active elements. In which case, an end cap 50 of conductive material such as aluminum can be used to complete the covering of the CRT. The end cap 50 has an opening therein only adequate to permit passage of the control cable 58.

Finger stock can be bonded to the inside of the end cap 50 for assuring the electrical and frictional attachment of the end cap 50 to the neck portion 54.

However, preferably, the neck portion 54 does not completely cover the gun and yoke of the CRT. In this way, the end cap 50 is a two-part structure comprising a Mu-metal tube covering the yoke and gun and engaging the neck portion 54 with the finger stock 52. The two-part end cap 50 also comprises an aluminum end that engages the Mu-metal tube using more finger stock and also accommodates the cable and plug 58. Such a two-part end cap 50 allows easier access to the yoke for servicing.

Although only one specific embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A structure for shielding non-visual electromagnetic emanations from a cathode ray tube having a face with a periphery, a neck, and a generally tapering portion, interconnecting the periphery of the face and the neck, comprising:

- a conductive screen having a periphery, the screen being positioned to cover the face of the cathode ray tube and capable of transmitting the visual emanations therefrom;

- a conductive collar conductively bonded to the periphery of the conductive screen and extending generally around the periphery of the face of the tube and projecting from the face generally toward the neck of the tube;
- a conductive, tapered member shaped generally like the tapered portion of the tube and having a lip, the tapered member being positioned around the tapered portion of the tube and its lip mating with the collar; and
- means for electrically interconnecting the tapered member to the collar.

2. A structure according to claim 1 further comprising a mounting frame bonded to the collar.

3. A structure according to claim 1 wherein the electrically interconnecting means comprises finger-type conductive spring stock positioned between the lip of the tapered member and the collar for engaging the tapered member and the collar.

4. A structure according to claim 1 wherein the conductive bonding between the conductive collar and the conductive screen is substantially continuous around the periphery of the conductive screen.

5. A structure according to claim 1 wherein the material of the tapered member is magnetically permeable.

6. A structure according to claim 1 further comprising a conductive end cap having a lip portion which is positioned to mate with the portion of the conductive, tapered member that extends along the neck of the cathode ray tube thereby enclosing the tube; and means for electrically interconnecting the end cap and the portion of the conductive, tapered member that extends along the neck of the cathode ray tube.

7. A structure according to claim 6 wherein the end cap comprises:

- a tubular member of magnetically-permeable material positioned to cover the yoke and gun of the tube; and
- an end of electrically-conductive material in contact with the tubular member.

8. A structure according to claim 1 wherein the collar contains a plurality of perforations.

9. A structure according to claim 8 further comprising a mounting frame bonded to the collar and through the perforations to the cathode ray tube.

10. A structure according to claim 9 wherein the mounting frame, collar, and tube are bonded by an epoxy compound that adheres to the mounting frame, the collar, and the tube, and which extends through the perforations in the collar.

* * * * *